(12) United States Patent
Zitzmann et al.

(10) Patent No.: US 11,869,734 B2
(45) Date of Patent: Jan. 9, 2024

(54) SWITCH FOR A MEDIUM VOLTAGE OR HIGH VOLTAGE SWITCHGEAR

(71) Applicant: ABB Schweiz AG, Baden (CH)

(72) Inventors: Robby Zitzmann, Mettmann (DE); Dalibor Kopp, Brno (CZ)

(73) Assignee: ABB Schweiz AG, Baden (CH)

(*) Notice: Subject to any disclaimer, the term of this patent is extended or adjusted under 35 U.S.C. 154(b) by 91 days.

(21) Appl. No.: 17/403,895

(22) Filed: Aug. 17, 2021

(65) Prior Publication Data
US 2021/0375565 A1 Dec. 2, 2021

Related U.S. Application Data

(63) Continuation of application No. PCT/EP2020/054209, filed on Feb. 18, 2020.

(30) Foreign Application Priority Data

Feb. 18, 2019 (EP) .................................. 19157848

(51) Int. Cl.
*H01H 31/00* (2006.01)
*H01H 31/02* (2006.01)
(Continued)

(52) U.S. Cl.
CPC ........ *H01H 31/026* (2013.01); *H01H 31/003* (2013.01); *H01H 31/023* (2013.01); *H01H 31/32* (2013.01); *H02B 13/075* (2013.01)

(58) Field of Classification Search
CPC .. H01H 31/026; H01H 31/003; H01H 31/023; H01H 31/32; H01H 3/36; H01H 3/54; H02B 13/075; H02B 13/035; H02B 13/045

USPC .... 200/48 R, 48 P, 48 A, 48 KB, 51.15, 447, 200/252; 218/12, 4, 45, 48, 55, 67, 80, 218/100
See application file for complete search history.

(56) References Cited

U.S. PATENT DOCUMENTS

| 4,413,166 | A  | * | 11/1983 | Meyer ................... | H01H 31/32 218/80 |
| 6,946,613 | B2 | * | 9/2005 | Otsuka ................... | H01H 31/32 218/78 |

(Continued)

FOREIGN PATENT DOCUMENTS

EP 1361633 A2 11/2003
WO WO 2013102285 A1 7/2013

*Primary Examiner* — William A Bolton
(74) *Attorney, Agent, or Firm* — Leydig, Voit & Mayer, Ltd.

(57) ABSTRACT

A switch for a medium voltage or high voltage switchgear includes: a first fixed contact; a second fixed contact; a moveable contact; at least one flexible link; and a contact drive. In an on state of the switch, the moveable contact is in a position that connects the first fixed contact to the second fixed contact. In an off state of the switch, the moveable contact is in a position where the first fixed contact is not connected to the second fixed contact. The at least one flexible link is connected to the moveable contact. The at least one flexible link engages with the contact drive. The contact drive pulls the moveable contact via the at least one flexible link and pushes the moveable contact via the at least one flexible link. Activation of the contact drive in a first mode moves the moveable contact.

18 Claims, 4 Drawing Sheets

(51) Int. Cl.
*H01H 31/32* (2006.01)
*H02B 13/075* (2006.01)

(56) References Cited

U.S. PATENT DOCUMENTS

| | | | | |
|---|---|---|---|---|
| 7,777,150 B2* | 8/2010 | Vaghini | ............... | H01H 33/6661 |
| | | | | 218/152 |
| 7,919,720 B2* | 4/2011 | Shimizu | ............... | H01H 31/003 |
| | | | | 218/55 |
| 8,106,326 B2* | 1/2012 | Nakauchi | ............. | H01H 31/003 |
| | | | | 218/55 |
| 8,487,203 B2* | 7/2013 | Shin | ..................... | H01H 3/46 |
| | | | | 218/43 |
| 8,987,622 B2* | 3/2015 | Ando | ..................... | H01H 3/44 |
| | | | | 200/401 |
| 9,343,881 B2* | 5/2016 | Hyrenbach | ............ | H02B 13/045 |
| 9,570,246 B2* | 2/2017 | Nitert | ..................... | H01H 31/32 |
| 2002/0104827 A1 | 8/2002 | Rokunohe et al. | | |
| 2018/0197709 A1* | 7/2018 | Liu | ..................... | H01H 3/04 |

* cited by examiner

SWITCH FOR A MEDIUM VOLTAGE OR HIGH VOLTAGE SWITCHGEAR

CROSS-REFERENCE TO PRIOR APPLICATION

This application is a continuation of International Patent Application No. PCT/EP2020/054209, filed on Feb. 18, 2020, which claims priority to European Patent Application No. EP 19157848.3, filed on Feb. 18, 2019. The entire disclosure of both applications is hereby incorporated by reference herein.

FIELD

The present invention relates to a switch that has utility as a two position or three position switch in an air-insulated or gas-insulated switchgear for medium voltage or high voltage applications.

BACKGROUND

Contact systems for two or three position disconnectors for switchgear are actuated by different techniques, comprising for example levers, spindles, push rods, in order to move the switch into each of its end positions. The task is to move the switch to a particular position and keep it in its position, whilst under load by nominal current and also during a situation when short circuit current flows. However, lever based actuation usual creates discontinuous transmission, whilst spindle based activation does not exhibit discontinuities to the same extent, but is valid for only several rotations, and the thread required to be produced on the bolt and nut needs a high accuracy and is therefore costly. Furthermore, push rod based actuation requires significant space for the actuation movement.

There is a need to address these issues.

SUMMARY

In an embodiment, the present invention provides a switch for a medium voltage or high voltage switchgear, comprising: a first fixed contact; a second fixed contact; a moveable contact; at least one flexible link; and a contact drive, wherein, in an on state of the switch, the moveable contact is in a position that connects the first fixed contact to the second fixed contact, wherein, in an off state of the switch, the moveable contact is in a position where the first fixed contact is not connected to the second fixed contact, wherein the at least one flexible link is connected to the moveable contact, wherein the at least one flexible link is configured to engage with the contact drive, the contact drive being configured to pull the moveable contact via the at least one flexible link and to push the moveable contact via the at least one flexible link, wherein activation of the contact drive in a first mode is configured to move the moveable contact to a position such that the switch is in the on state, and wherein activation of the contact drive in a second mode is drive is configured to move the moveable contact to a position such that the switch is in the off state.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
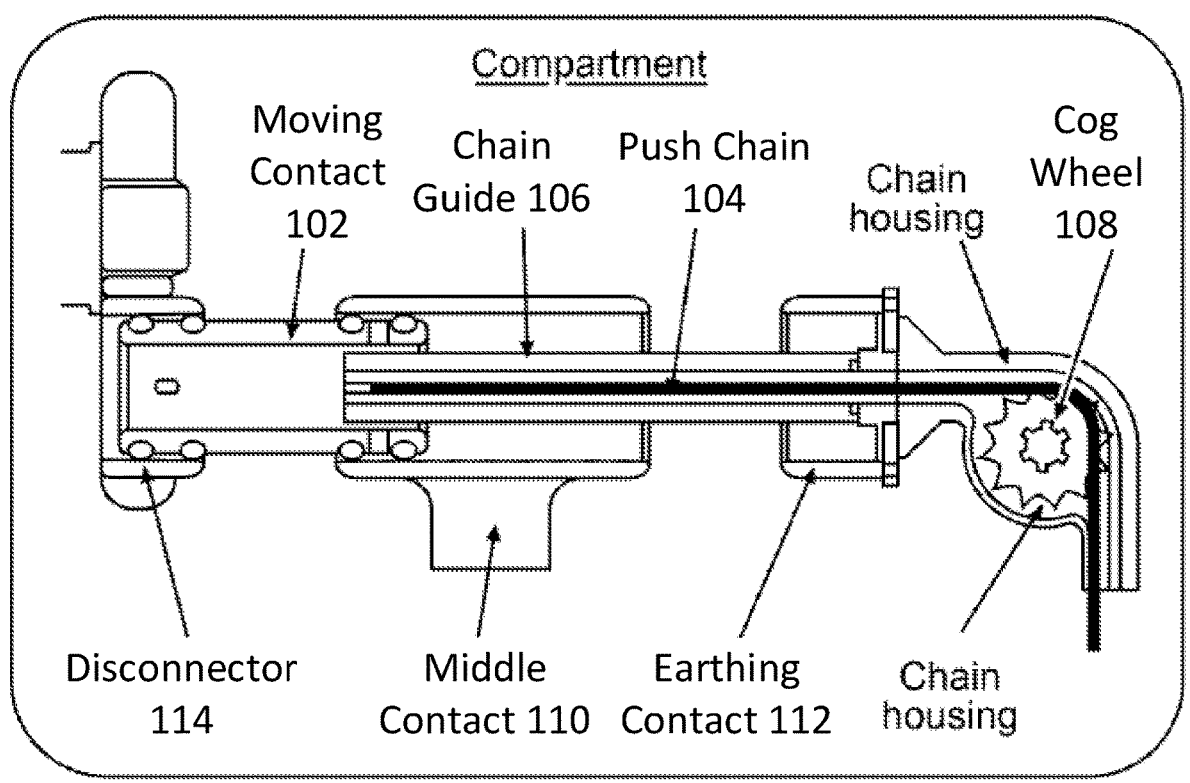
FIG. 1 shows an example of a switch.

In an embodiment, the present invention provides an improved two or three position switch for a medium voltage or high voltage switchgear.

In a first aspect, there is provided a switch for a medium voltage or high voltage switchgear, the switch comprising:
   a first fixed contact;
   a second fixed contact;
   a moveable contact;
   at least one flexible link; and
   a contact drive.

In an on state of the switch the moveable contact is in a position that connects the first fixed contact to the second fixed contact. In an off state of the switch the moveable contact is in a position where the first fixed contact is not connected to the second fixed contact. The at least one flexible link is connected to the moveable contact. The at least one flexible link engages with the contact drive. The contact drive is configured to pull the moveable contact via the at least one flexible link and the contact drive is configured to push the moveable contact via the at least one flexible link. Activation of the contact drive in a first mode is configured to move the moveable contact to the position such that the switch is in the on state. Activation of the contact drive in a second mode is drive is configured to move the moveable contact to the position such that the switch is in the off state.

In this way, an actuation element is provided that utilizes a flexible link to enable continuous transmission for the switching from one state to another state (on-off and vice versa is provided), and where less space is required because the flexible link can be coiled or collapsed as it is pulled.

In an example, the switch comprises a fixed earth contact. In an earthing state of the switch the moveable contact is configured to be in a position that connects the second fixed contact to the earthing fixed contact. Activation of the contact drive in a third mode is configured to move the moveable contact to the position such that the switch is in the earthing state.

Thus, two and three position switches for medium and high voltage switchgear is enabled.

In an example, the switch comprises a link guide. At least part of the at least one flexible link is configured to run within or adjacent to the link guide in a longitudinal direction. The link guide is configured to inhibit the at least one flexible link from flexing in a direction perpendicular to the longitudinal direction.

In this way, the link guide in stopping the flexible link from deforming it at least one direction, enables high axial forces to be applied during pushing actuation as well as pulling actuation.

In an example, the contact drive comprises at least one cog wheel configured to engage with the at least one flexible link.

In this manner, a simple mechanism if provided for pulling and pushing the flexible link through rotation of a cog wheel, that for example has teeth to engage with a flexible link in the form of a chain or notches or ridges to engage with a flexible link in the form of a toothed belt.

In an example, rotation of a cog wheel of the at least one cog wheel in a first direction is configured to pull a flexible link, and rotation of the cog wheel in a direction counter to the first direction is configured to push the flexible link.

In an example, the at least one flexible link is two flexible links.

In this manner, a flexible link guide may not be required, because the flexible links can be configured to resist bending when being pushed as well as when being pulled.

In an example, the at least one cog wheel is two cog wheels.

In an example, rotation of a first cog wheel of the two cog wheels in a first direction is configured to pull a first flexible link of the two flexible links and rotation of a second cog wheel of the two cog wheels in a second direction counter to the first direction is configured to pull a second flexible link of the two flexible links. Also, rotation of the first cog wheel of the two cog wheels in the second direction is configured to push the first flexible link of the two flexible links and rotation of the second cog wheel of the two cog wheels in the first direction is configured to push the second flexible link of the two flexible links.

In other words, the two flexible links are provided back to back. Thus, flexible links in the form of push chains that resist bending in one direction but can be bent in the other direction can be placed back to back such that they resist bending outwards away from each other. Then, during pushing they form a single flexible link that resists bending and that can apply high axial forces, and similarly can apply high axial forces when pulled and that can still be collapsed or coiled into two sets of collapsed or coiled flexible links.

In an example, the at least one flexible link comprises at least one chain.

In an example, the at least one chain comprises a push chain.

In an example, the push chain, when extended in a longitudinal axis, is configured to enable the chain to bend out of the axis in a first direction perpendicular to the axis and configured to resist the chain being bent out of the axis in a second direction opposite to the first direction.

In an example, the at least one flexible link comprises at least one toothed belt.

In an example, the switch is configured to transition between the second mode and the third mode without entering the first mode.

Thus, the switch can move from an off state to an earthing state, and vice versa, without entering the on state.

In an example, the at least one cog wheel is configured to rotate through less that one revolution when the switch transitions between the second mode and the third mode.

In this manner, a two or three position switch is provided where actuation is facilitated by less than one rotation of a cog wheel.

In an example, the contact drive is configured to pull the at least one flexible link to transition from the second mode to the third mode.

In an example, the contact drive is configured to push the at least one flexible link to transition from the third mode to the second mode.

In an example, the switch is configured to transition between the second mode and the first mode without entering the third mode.

Thus, the switch can move from an off state to an on state, and vice versa, without entering the earthing state.

In an example, the at least one cog wheel is configured to rotate through less that one revolution when the switch transitions between the second mode and the first mode.

In this manner, a two or three position switch is provided where actuation is facilitated by less than one rotation of a cog wheel.

In an example, the contact drive is configured to push the at least one flexible link to transition from the second mode to the first mode.

In an example, the contact drive is configured to pull the at least one flexible link to transition from the first mode to the second mode.

In an example, the switch comprises a compartment configured to accommodate a length of the at least one flexible link when the contact drive pulls the at least one flexible link. A maximum internal dimension of the compartment is less than the length of the at least one flexible link.

In this manner, space is saved as the flexible link can be coiled or collapsed as required.

In a second aspect, there is provided a medium voltage or high voltage switchgear, comprising at least one switch according to the first aspect.

The above aspects and examples will become apparent from and be elucidated with reference to the embodiments described hereinafter.

FIGS. 1-6 relate to a switch for a medium voltage or high voltage switchgear. In an example, the switch comprises a first fixed contact, a second fixed contact, a moveable contact, at least one flexible link, and a contact drive. In an on state of the switch the moveable contact is in a position that connects the first fixed contact to the second fixed contact. In an off state of the switch the moveable contact is in a position where the first fixed contact is not connected to the second fixed contact. The at least one flexible link is connected to the moveable contact. The at least one flexible link engages with the contact drive. The contact drive is configured to pull the moveable contact via the at least one flexible link. The contact drive is configured also to push the moveable contact via the at least one flexible link. Activation of the contact drive in a first mode is configured to move the moveable contact to the position such that the switch is in the on state. Activation of the contact drive in a second mode is drive is configured to move the moveable contact to the position such that the switch is in the off state.

In an example, the on state relates to current being able to flow from the first fixed contact to the second fixed contact via the moveable contact.

In an example, in the off state the moveable contact is configured to be located substantially within the second fixed contact.

In an example, the first fixed contact is a disconnector contact.

In an example, the second fixed contact is a middle contact.

According to an example, switch comprises a fixed earth contact. In an earthing state of the switch the moveable contact is configured to be in a position that connects the second fixed contact to the earthing fixed contact. Activation of the contact drive in a third mode is configured to move the moveable contact to the position such that the switch is in the earthing state.

According to an example, the switch comprises a link guide. At least part of the at least one flexible link is configured to run within or adjacent to the link guide in a longitudinal direction. The link guide is configured to inhibit or resist the at least one flexible link from flexing in a direction perpendicular to the longitudinal direction.

In an example, the link guide is located on only one side of the flexible link.

In an example, the link guide is located on at least opposing sides of the flexible link.

According to an example, the contact drive comprises at least one cog wheel configured to engage with the at least one flexible link.

According to an example, rotation of a cog wheel of the at least one cog wheel in a first direction is configured to pull a flexible link. Then rotation of the cog wheel in a direction counter to the first direction is configured to push the flexible link.

According to an example, the at least one flexible link is two flexible links.

According to an example, the at least one cog wheel is two cog wheels.

According to an example, rotation of a first cog wheel of the two cog wheels in a first direction is configured to pull a first flexible link of the two flexible links and rotation of a second cog wheel of the two cog wheels in a second direction counter to the first direction is configured to pull a second flexible link of the two flexible links. Then rotation of the first cog wheel of the two cog wheels in the second direction is configured to push the first flexible link of the two flexible links and rotation of the second cog wheel of the two cog wheels in the first direction is configured to push the second flexible link of the two flexible links.

According to an example, the at least one flexible link comprises at least one chain.

According to an example, the at least one chain comprises a push chain.

According to an example, the push chain, when extended in a longitudinal axis is configured to enable the chain to bend out of the axis in a first direction perpendicular to the axis and configured to resist the chain being bent out of the axis in a second direction opposite to the first direction.

According to an example, the at least one flexible link comprises at least one toothed belt.

According to an example, the switch is configured to transition between the second mode and the third mode without entering the first mode.

According to an example, the at least one cog wheel is configured to rotate through less that one revolution when the switch transitions between the second mode and the third mode.

According to an example, the contact drive is configured to pull the at least one flexible link to transition from the second mode to the third mode.

According to an example, the contact drive is configured to push the at least one flexible link to transition from the third mode to the second mode.

According to an example, the switch is configured to transition between the second mode and the first mode without entering the third mode.

According to an example, the at least one cog wheel is configured to rotate through less that one revolution when the switch transitions between the second mode and the first mode.

In an example, the at least one cog wheel is configured to rotate through less that one revolution when the switch transitions between the first mode and the third mode. Thus, the switch can move from an on state through an off state to an earthing state via less than one rotation of an actuating cog wheel.

According to an example, the contact drive is configured to push the at least one flexible link to transition from the second mode to the first mode.

According to an example, the contact drive is configured to pull the at least one flexible link to transition from the first mode to the second mode.

According to an example, the switch comprises a compartment configured to accommodate a length of the at least one flexible link when the contact drive pulls the at least one flexible link. A maximum internal dimension of the compartment is less than the length of the at least one flexible link that resides in the compartment.

Thus, the switch as described in any example above finds utility in a medium voltage or high voltage switchgear.

Figure 2:
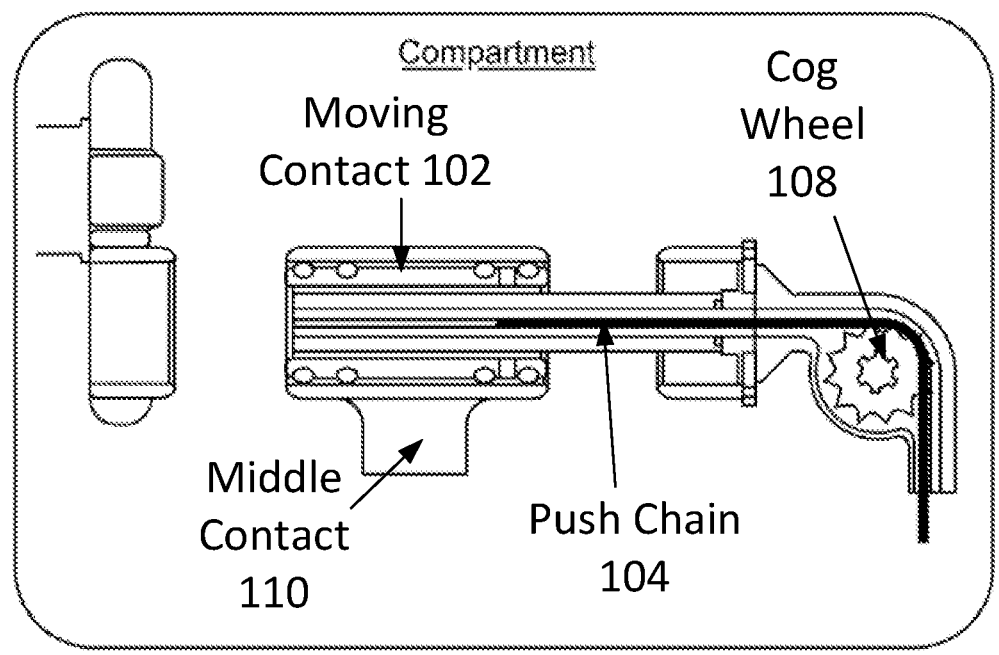
FIG. 2 shows an example of a switch.
Figure 3:
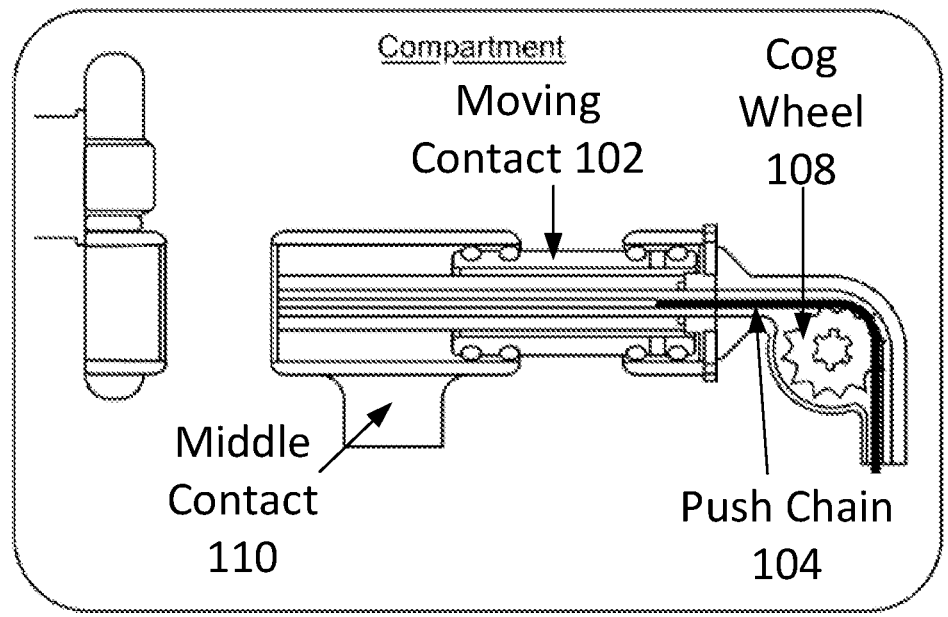
FIG. 3 shows an example of a switch.
Figure 4:
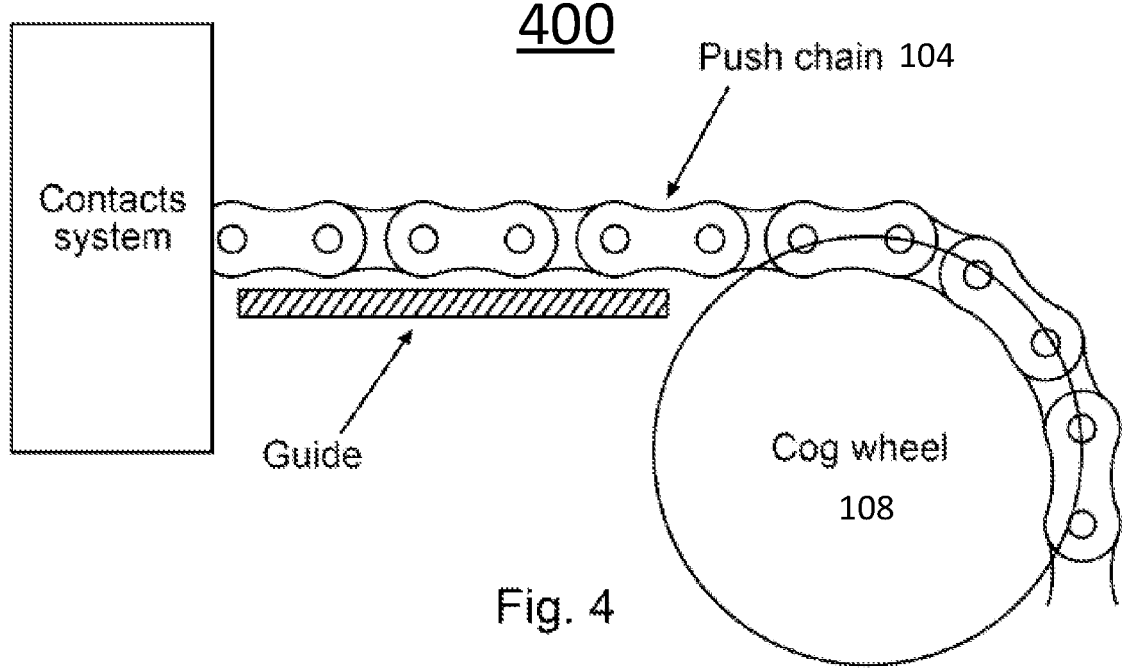
FIG. 4 shows a part of an example of a switch.

Thus, relating to the figures a specific detailed embodiment is now described. A push chain 104 of the switch is attached or connected to a moving or movable contact 102. The push chain 104 engages with a cog wheel 108, and is partially wrapped around the cog wheel 108, where teeth of the cog wheel 108 protrude into and through the push chain 104. Thus, rotation of the cog wheel 108 pulls or pushes the push chain 104 is required. Here, a push chain 104 is a chain that is bending resistant at one side and limp at the opposite side. The switch also has a disconnector contact at one end, a middle contact 110 in the centre, and an earthing contact 112 at the end closest to the cog wheel. The cog wheel 108 forms part of a contact drive, having a motor and control electronics. A chain guide 106 is provided, shown in more detail in FIG. 4. As discussed above, push chain 104 can flex in one direction but resists flexing in the other direction, and the chain guide 106 is provided on the side that the push chain 104 can flex. Thus, with a chain guide 106 is provided the push chain 104 cannot then flex. In this manner, with the usage of the guide the push chain 104 can transfer high forces in an longitudinal direction, via a push and pull system that is actuated by a chain wheel or cog wheel 108. As shown in FIG. 1, the cog wheel 108 has rotated in an anticlockwise direction and the push chain 104 has pushed the movable contact 102 to the left until it connects the disconnector 114 contact with the middle contact 110, and the disconnector 114 is then in an on position. Then, as shown in FIG. 2 rotation of the cog wheel 108 in a clockwise direction has pulled the push chain 104 leading to the movable contact 102 being pulled to a position within middle contact 110, resulting in a disconnector 114 off and earth are off position. As shown in FIG. 3 further rotation of the cog wheel 108 in a clockwise direction has pulled the push chain 104 leading to the movable contact 102 being pulled to a position such that the movable contact 102 connects the middle contact 110 to the earthed contact 112, resulting in an earther on position. Then, rotation of the cog wheel 108 in an anticlockwise direction can push the movable contact 102 from the Earth on position to the disconnector off and earth of position, with further rotation in the anticlockwise direction leading to the movable contact 102 being pushed to the disconnector on position.

Behind the chain wheel or cog wheel 108, the push chain 104 can collapse in a provided room and does not need more space. An advantage is to have an actuation element which can actuate a contact system by less than one rotation together, with the advantage that a continuous transmission is provided with less demand for space. A further advantage is that the drive is independent of the position of the contact system in relation to the orientation (horizontal, vertical, diagonal). Also, the connection of the push chain 104 to the movable contact 102 is relatively simple. Also, by using a push chain activation can be facilitated through only one mechanic bush, lead to less parts and to less risk of leakage during actuation.

It is to be noted that instead of a push chain 104, the usage of a drive belt can be used but this may require additional mechanical support.

Figure 5:
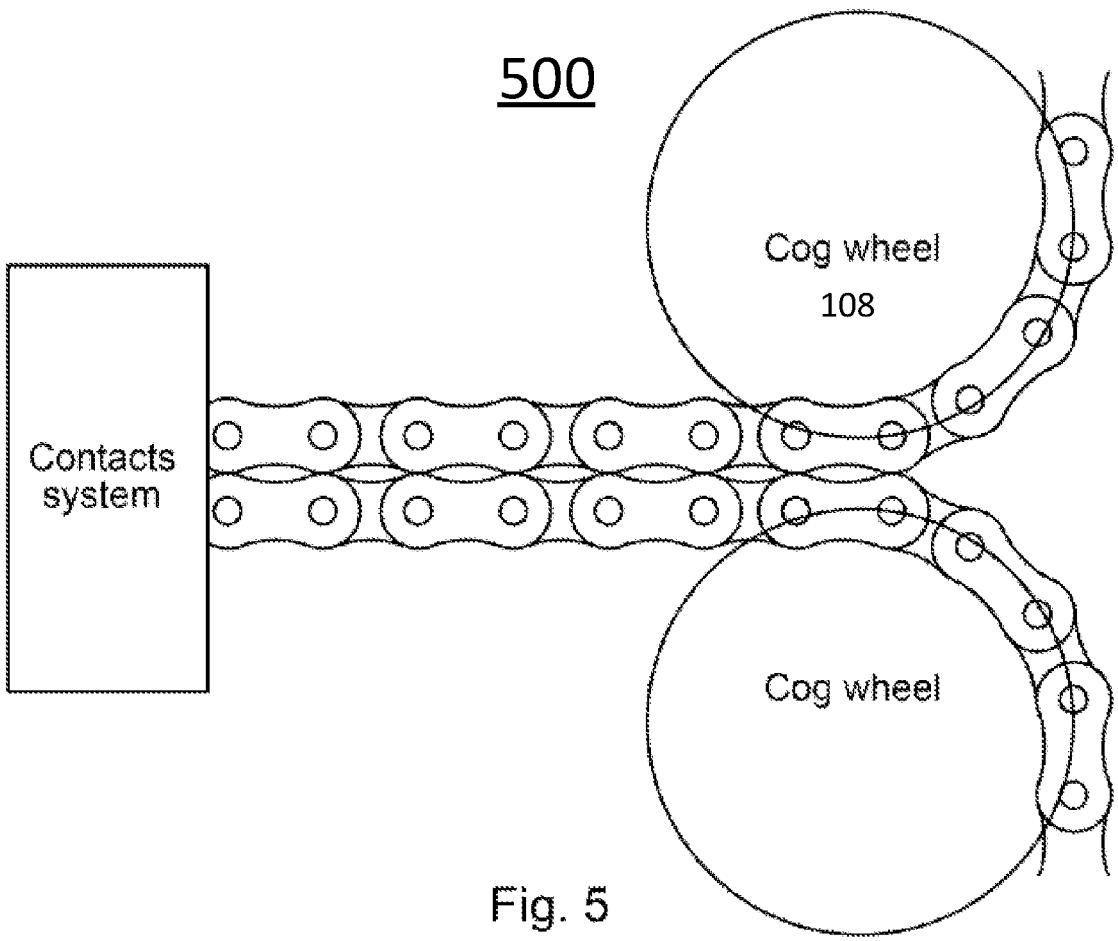
FIG. 5 shows a part of an example of a switch.

Furthermore, instead of using one push chain, two chains or two toothed belts can be used. This is shown in FIG. 5, where two push chains are used back-to-back, where they can only flex towards each other and therefore as a pair cannot then flex when located back-to-back, but can still flex behind the cog wheel 108 and be stored in space-saving manner. However, the two chains acting in this manner can still pull the movable contact 102 and pushed the movable contact with high force, and in this case a chain guide is not required, although clearly could still be utilised.

Figure 6:
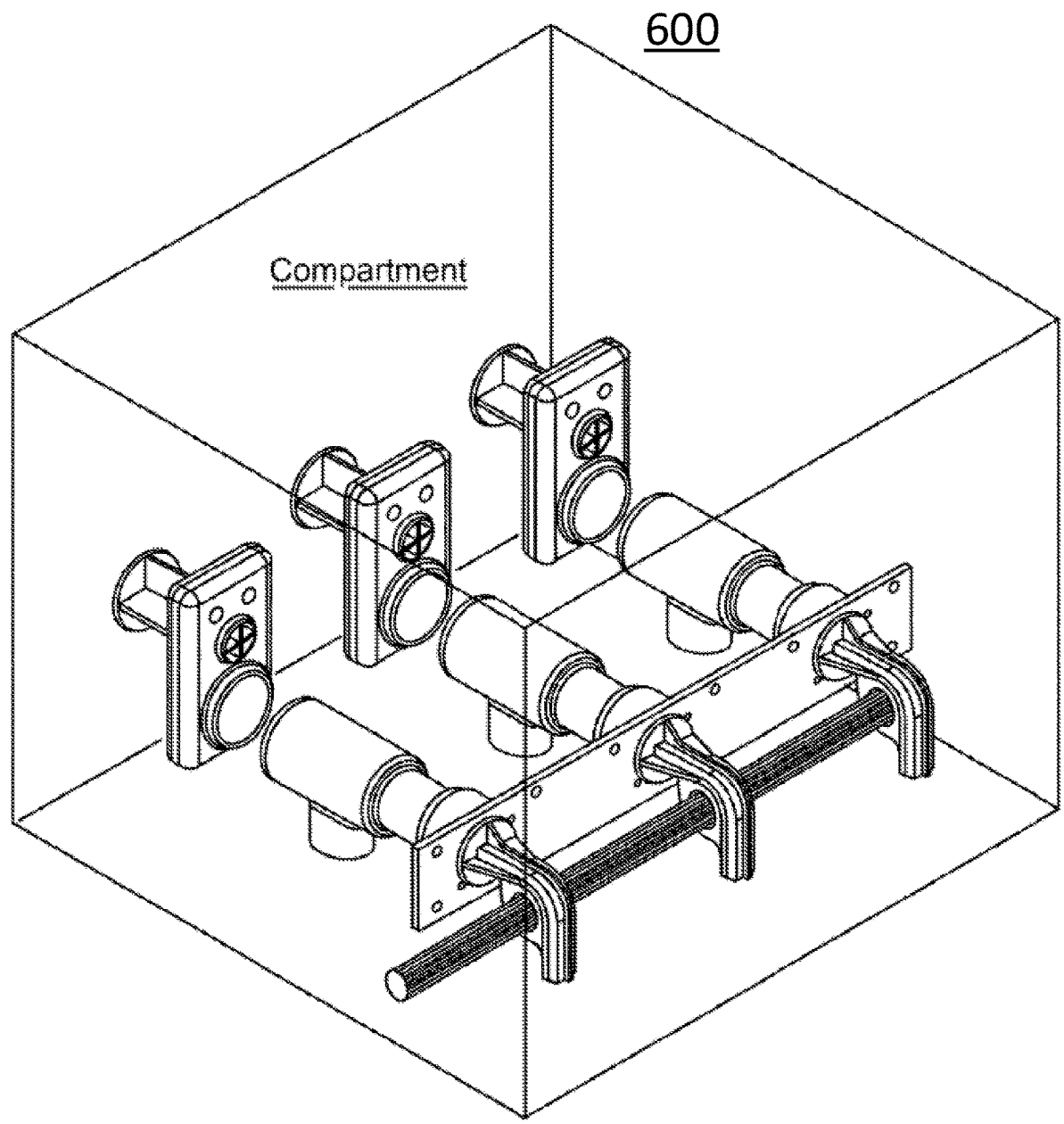
FIG. 6 shows a compartment of a medium voltage or high voltage switchgear with three examples of a switch.

FIG. 6 shows an example of three switches in a compartment 600 of a medium voltage or high voltage switchgear, with the three switches shown in the earthing on state.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switch for a medium voltage or high voltage switchgear, comprising:
    a first fixed contact;
    a second fixed contact;
    a moveable contact;
    at least one flexible link; and
    a contact drive,
    wherein, in an on state of the switch, the moveable contact is in a position that connects the first fixed contact to the second fixed contact,
    wherein, in an off state of the switch, the moveable contact is in a position where the first fixed contact is not connected to the second fixed contact,
    wherein the at least one flexible link is connected to the moveable contact,
    wherein the at least one flexible link is configured to engage with the contact drive, the contact drive being configured to pull the moveable contact via the at least one flexible link and to push the moveable contact via the at least one flexible link,
    wherein activation of the contact drive in a first mode is configured to move the moveable contact to a position such that the switch is in the on state,
    wherein activation of the contact drive in a second mode is drive is configured to move the moveable contact to a position such that the switch is in the off state,
    wherein the contact drive comprises at least one cog wheel configured to engage with the at least one flexible link,
    wherein the at least one flexible link comprises two flexible links,
    wherein the at least one cog wheel comprises two cog wheels,
    wherein rotation of a first cog wheel of the two cog wheels in a first direction is configured to pull a first flexible link of the two flexible links and rotation of a second cog wheel of the two cog wheels in a second direction counter to the first direction is configured to pull a second flexible link of the two flexible links, and
    wherein rotation of the first cog wheel in the second direction is configured to push the first flexible link and rotation of the second cog wheel in the first direction is configured to push the second flexible link.

2. The switch of claim 1, further comprising:
    a fixed earth contact,
    wherein, in an earthing state of the switch, the moveable contact is configured to be in a position that connects the second fixed contact to an earthing fixed contact, and
    wherein activation of the contact drive in a third mode is configured to move the moveable contact to a position such that the switch is in the earthing state.

3. The switch of claim 2, wherein the contact drive is configured to pull the at least one flexible link to transition from the second mode to the third mode.

4. The switch of claim 2 wherein the contact drive is configured to push the at least one flexible link to transition from the third mode to the second mode.

5. The switch of claim 1, further comprising:
    a link guide,
    wherein at least part of the at least one flexible link is configured to run within or adjacent to the link guide in a longitudinal direction, and
    wherein the link guide is configured to inhibit the at least one flexible link from flexing in a direction perpendicular to the longitudinal direction.

6. The switch of claim 1, wherein rotation of a cog wheel of the at least one cog wheel in a first direction is configured to pull the flexible link, and
    wherein rotation of the cog wheel in a direction counter to the first direction is configured to push the flexible link.

7. The switch of claim 1, wherein the at least one flexible link comprises at least one chain.

8. The switch of claim 7, wherein the at least one chain comprises a push chain.

9. The switch of claim 8, wherein the push chain, when extended in a longitudinal axis, is configured to enable the push chain to bend out of the longitudinal axis in a first direction perpendicular to the longitudinal axis and to resist the push chain being bent out of the longitudinal axis in a second direction opposite to the first direction.

10. The switch of claim 1, wherein the at least one flexible link comprises at least one toothed belt.

11. The switch of claim 2, wherein the switch is configured to transition between the second mode and the third mode without entering the first mode.

12. The switch of claim 11, wherein the at least one cog wheel is configured to rotate through less than one revolution when the switch transitions between the second mode and the third mode.

13. The switch of claim 2, wherein the switch is configured to transition between the second mode and the first mode without entering the third mode.

14. The switch of claim 13, wherein the at least one cog wheel is configured to rotate through less than one revolution when the switch transitions between the second mode and the first mode.

15. The switch of claim 1, wherein the contact drive is configured to push the at least one flexible link to transition from the second mode to the first mode.

16. The switch of claim 1, wherein the contact drive is configured to pull the at least one flexible link to transition from the first mode to the second mode.

17. The switch of claim 1, further comprising:
a compartment configured to accommodate a length of the at least one flexible link when the contact drive pulls the at least one flexible link,
wherein a maximum internal dimension of the compartment is less than the length of the at least one flexible link.

18. A medium voltage or high voltage switchgear, comprising:
at least one switch of claim 1.

* * * * *